Sept. 23, 1930.  C. H. RUBY  1,776,639
WEAR COMPENSATING MEANS FOR CONNECTING ROD BEARINGS
Filed April 25, 1929
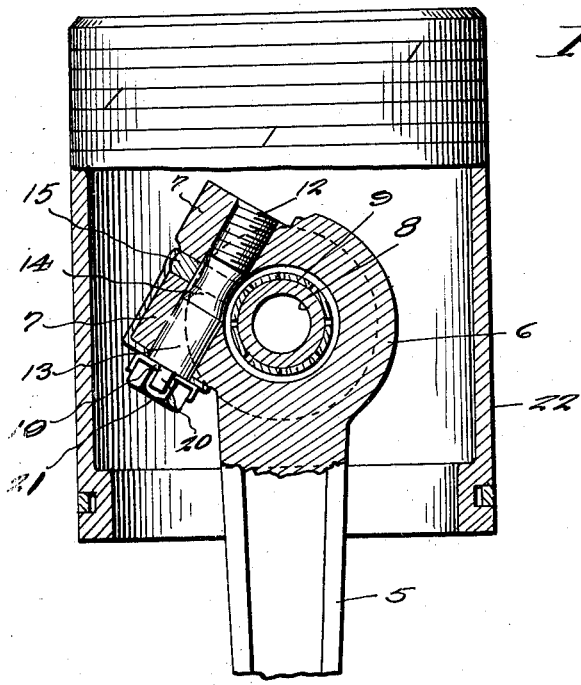
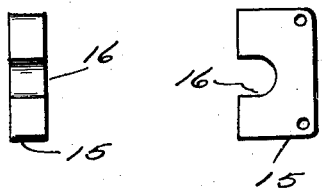
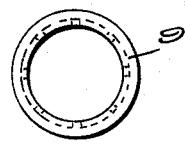
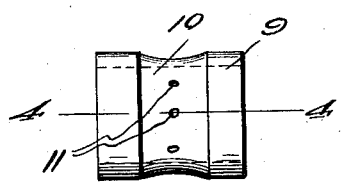
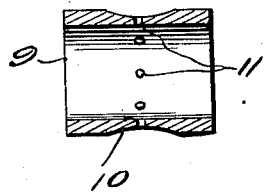
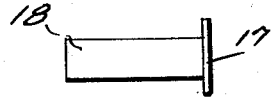
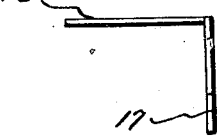
Inventor
Charles H. Ruby
By Clarence A. O'Brien
Attorney Patented Sept. 23, 1930

1,776,639

UNITED STATES PATENT OFFICE

CHARLES H. RUBY, OF ST. PETERSBURG, FLORIDA

WEAR-COMPENSATING MEANS FOR CONNECTING-ROD BEARINGS

Application filed April 25, 1929. Serial No. 358,044.

The present invention relates to improvements in wear compensators and more particularly the invention has reference to novel wear compensating means for the bearings of connecting rods, especially those employed for connecting the pistons of internal combustion engines to the usual crank shaft.

The primary object of the invention is to provide a wear compensator which may be actuated to take up wear or clearance between the usual wrist pin and bushings.

Another important object of the invention is to provide novel means for adjusting the wrist pin bearing without removing the piston.

These and other important objects of the invention will become more apparent to the reader after considering the invention as described and claimed hereinafter.

In the drawings:—

Figure 1 represents a partial vertical sectional view through a piston and wrist pin bearing structure.

Fig. 2 represents an edge elevation of a shim employed in the novel compensator.

Fig. 3 represents a side elevation of the shim.

Fig. 3ª represents a side elevation of the lubricating bushing.

Fig. 4 represents a longitudinal sectional view through the bushing taken substantially on the line 4—4 of Fig. 3ª.

Fig. 5 represents an end elevation of the bushing.

Fig. 6 represents a side elevation of the shim securing member.

Fig. 7 represents an edge elevation of the shim securing member.

Referring to the drawings, wherein like numerals designate like parts, it will be seen that the usual connecting rod is designated by numeral 5 and is provided at its upper end with the usual split bearing construction 6, which includes the jaw extensions 7—7.

These jaws are contractible to a certain extent to permit contraction of the bore through the bearing 6 in compensating for wear. Numeral 8 designates the usual wrist pin; between the wrist pin and the bearing 6, is interposed the bushing 9.

This bushing 9 is clearly shown in Figs. 3ª and 4 and is reduced circumferentially at its intermediacy as at 10, and at this point provided with circumferentially spaced openings 11 through which a lubricant may flow.

The jaw members 7—7 on the bearing 6 are provided with registering bores, one of which is threaded to receive the threaded end portion 12 of the bolt 13, which bolt is reduced at its intermediate portion 14. The bolt is threadable into the threaded bore in the manner shown in Fig. 1, for tightening the jaw members against the shim 15 interposed. The shim 15 is in the form of a block provided with a cut-out portion 16 to accommodate the reduced intermediacy of the bolt 13.

The bolt 13 is adapted to pass through the enlarged leg portion 17 of an L-shaped shim securing member 18, the free end of the remaining leg of the member, being disposed over the shim 15 in substantially the manner shown in Fig. 1.

The plate 19 is suitably secured to the enlarged leg portion of the member 18 and is provided with a plurality of radiating lugs 20 capable of being bent for disposition against the flat sides of the polygonal head 21 of the bolt 13.

The bolt is disposed in the manner shown in Fig. 1, so that by engaging a suitable tool upwardly within the skirt portion of the piston, (referred to by the numeral 22), the bolt may be loosened to permit the removal of the shim for reducing the thickness of shim or shims where they are of the laminated or block type.

It will thus be seen that the present invention presents a simple yet convenient type of wear compensator for the usual wrist pin bearing of connecting rods, and although the foregoing description has been in specific terms, it is to be understood that various changes in the specific shape, size, materials may be resorted to without departing from the spirit and scope of the invention as claimed hereinafter.

Having thus described my invention, what I claim as new is:—

1. A wear compensator for connecting rod bearings of the split feed type; a threaded bolt for feeding the jaw portions of the bearings together, a bushing for disposition within the bearing, and against which the bearing is adapted to clamp, a shim for disposition between said jaw portions, means for securing the shim against displacement, said means consisting of a plate having an opening therein for receiving the bolt, and a tongue projecting from the plate for tensional engagement against the shim.

2. Adjustable means for split clamp type bearings wherein a screw is employed for feeding the jaw portions toward or away from each other; a U-shaped shim for disposition between the jaw portions of the bearings and in straddled relation with respect to the screw, an annular element for receiving the screw, and an elongated spring arm projecting from the annular element for tensionally engaging the bight portion of the said shim at its free end.

In testimony whereof I affix my signature.

CHARLES H. RUBY.